Nov. 25, 1952   J. B. PETERSON   2,618,973
AIR SPEED INTEGRATOR
Filed May 14, 1946   3 Sheets-Sheet 1

INVENTOR.
JOHN B. PETERSON
BY
Strauch & Hoffman
ATTORNEYS

Nov. 25, 1952        J. B. PETERSON        2,618,973
AIR SPEED INTEGRATOR
Filed May 14, 1946                              3 Sheets-Sheet 3
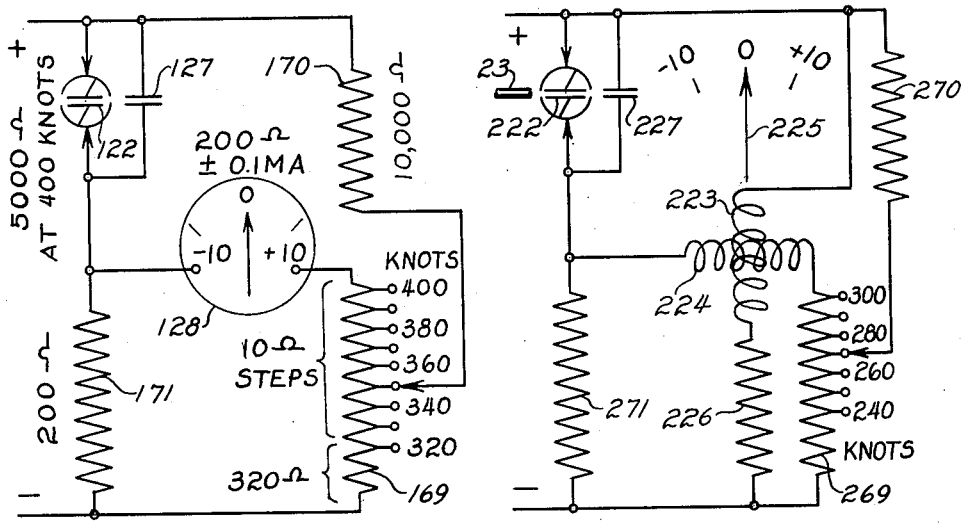
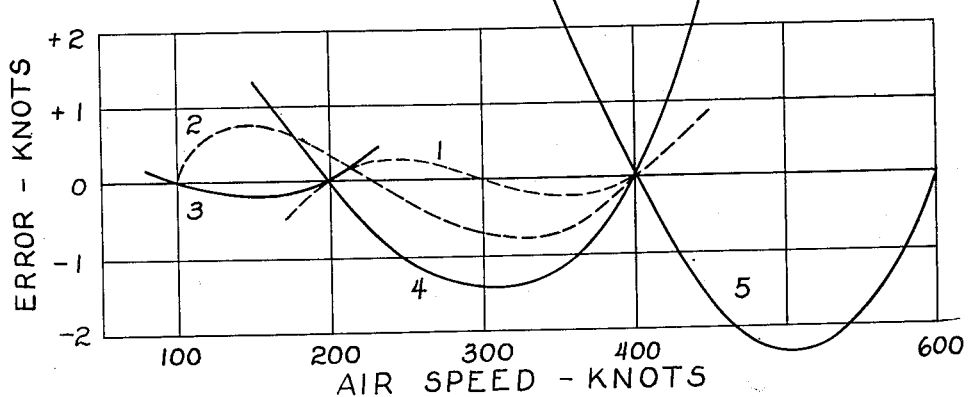
INVENTOR.
JOHN B. PETERSON
BY
*Strauch & Hoffman*
ATTORNEYS Patented Nov. 25, 1952

2,618,973

UNITED STATES PATENT OFFICE 2,618,973

AIR SPEED INTEGRATOR

John B. Peterson, Bethesda, Md.; Ruth L. Peterson, administratrix of said John B. Peterson, deceased, assignor to Bendix Aviation Corporation, Teterboro, N. J., a corporation of Delaware Application May 14, 1946, Serial No. 669,544

4 Claims. (Cl. 73—183)

This invention relates to aircraft instruments, and in particular to an electric true air-speed integrator.

The need for reliable and accurate equipment for totalizing the true air distance traveled by an aircraft in flight has been a long standing one. Several types of air logs have been devised and used in the past, some of which take the form of air driven propellers suspended in the air stream, and others of which are dependent upon Pitot-static tubes or the like. My improved instrument is of the latter type, combining simultaneous Pitot pressure, static or barometric pressure at the flight altitude, and temperature measurements in such a manner as to provide signals to a tracking machine at a frequency which is directly proportional to the true air speed. The tracking machine, which does not form any part of my invention, utilizes these signals combined with those from a compass to determine the air track of the aircraft, and may also incorporate wind direction and velocity factors etc., to determine the ground track or the latitude and longitude of the aircraft.

It is therefore a primary object of my invention to provide a novel and improved air-speed integrator.

It is another object of my invention to provide a novel and improved air-speed integrator and indicator.

It is another object of my invention to provide a novel air-speed integrator which utilizes a reversing condenser for integrating the true air speed as derived from the Pitot-static differential pressure.

It is a further object to provide novel electrical means for computing, indicating, and integrating the true air speed of an aircraft.

Other objects will become apparent as the description proceeds in connection with the drawings, wherein:

Figure 3 is a diagram of an air-speed indicator for use with an air-speed integrator.

Figure 4 is a diagram of an air-speed indicator utilizing a null indicator of the ratio type.

Figure 5 shows typical error curves which result from the use of approximate equations.

Figure 1:
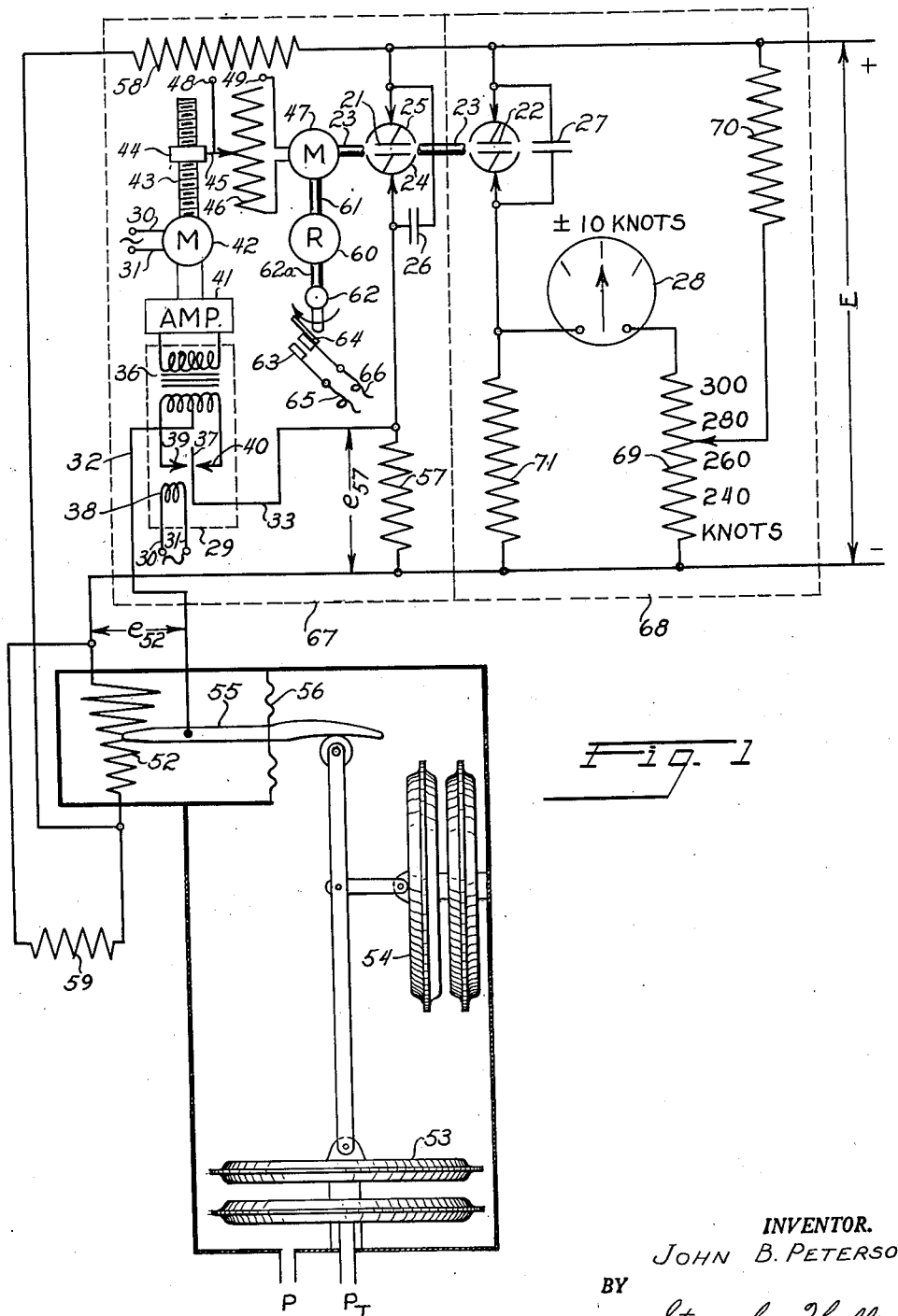
Figure 1 is a diagrammatic illustration of one embodiment of my invention showing a true air-speed integrator wherein the ratio of the Pitot-static differential pressure to the static pressure is determined mechanically.

In developing the mathematical theory of the instrument the following terminology will be used:

$V$ = true air-speed
$P$ = static pressure
$P_T$ = the total or Pitot pressure
$Q = P_T - P$ = Pitot-static differential pressure
$T$ = the temperature, degrees centigrade absolute, of the air in which the aircraft is flying
$U$ = the apparent temperature = $T$ plus the adiabatic rise due to the speed $V$, $U = T + HV^2$
$a$ = the speed of sound
$M$ = the Mach number = $V/a$
$E$ = the voltage of the direct current supply
$e$ = voltage
$i$ = current
$R$ = resistance
$G$ = conductance
$C$ = capacity
$N$ = rate of reversal of condenser, discharges per second.
K, A, B, and $x$ are constants the value of which may be different for different equations.
F, F', F'' etc. are used to expresse an unique function of one or more variables, as in Equation 2 below.

The following equation for subsonic air speeds has been derived from Equation 3a of the National Advisory Committee for Aeronautics Technical Report 420, published in 1932:

$$V = K\sqrt{\left[\left(1+\frac{Q}{P}\right)^{2/7}-1\right]T} \quad (1)$$

or $$V = \left[F\left(\frac{Q}{P}\right)\right]\sqrt{T} \quad (2)$$

The equation for supersonic speeds has been derived from Equations 3.1 and 3.2 given in "Aerodynamic Theory," volume III, page 241, edited by W. F. Durand and published in 1940. It is:

$$\frac{P_T}{P} = \frac{7M^2-1}{6}\left(\frac{36}{35}+\frac{36/35}{7M^2-1}\right)^{3.5} \quad (3)$$

where the Mach number, $M = V/a$

Since the velocity of sound, $a$, is independent of air pressure and varies directly as the square root of the absolute temperature, we can solve Equation 3 for V, and write:

$$V = \left[F^1\left(\frac{Q}{P}\right)\right]\sqrt{T} \quad (4)$$

This equation for supersonic speeds is similar to Equation 2 for subsonic speeds but the function takes a slightly different form.

For either subsonic or supersonic speeds we may write, $$V^2 = \left[F''\left(\frac{Q}{P}\right)\right](U - HV^2) \quad (5)$$

where $HV^2$ is the adiabatic temperature rise of the temperature element. H is a constant associated with the temperature element and dependent on its shape and construction. The constant H will also be different for different units of speed (knots, M. P. H., etc.). At 400 knots the correction may amount to 10 degrees centigrade.

From Equation 5 is obtained:

$$V^2 = \frac{F''\left(\frac{Q}{P}\right)}{1 + F''\left(\frac{Q}{P}\right)A} \cdot U$$

We may then write $$V = \left[F'''\left(\frac{Q}{P}\right)\right]\sqrt{U} \quad (6)$$

Thus for any temperature element we can determine the value of the constant H and write a true air speed equation using the apparent temperature rather than the true temperature.

For a given air speed range, either subsonic or supersonic Equation 4 can be approximated by $$V \approxeq A\left(\frac{Q}{P}\right)^x \sqrt{T} \approxeq A\frac{Q^x}{P^x}\sqrt{T} \quad (7)$$

or a more accurate approximation is, $$V \approxeq \left[A\left(\frac{Q}{P}\right)^x - B\right]\sqrt{T} \quad (8)$$

Also, the following similar approximations can be written for Equation 6

$$V \approxeq A\left(\frac{Q}{P}\right)^x \sqrt{U} \quad (9)$$

and $$V \approxeq \left[A\left(\frac{Q}{P}\right)^x - B\right]\sqrt{U} \quad (10)$$

To approximate the exact curve for a certain range, the values of the constants A, B, and $x$ are selected so as to make the approximation equal to the accurate values at two points for Equation 9 or at three points for Equation 10.

To facilitate the explanation of the figures, certain components which are common to all of the species will be described before the figures are taken up in detail.

Each drawing contains one or more reversing condensers, as 21 and 22 in Figure 1. These reversing condenserrs in their simplest form each comprises a fixed condenser mounted on a rotating shaft 23 and rotating therewith. As shown in Figure 1 the terminals of condenser 21 are connected to the segments 24 and 25 of a two-segment commutator. The reversing condenser 21 in parallel with the by-pass condenser 26 is equivalent to a resistance of value, $$R = \frac{10^6}{CN} \quad (11)$$

where C is the capacity of the reversing condenser in microfarads and N is the number of discharges per second of the reversing condenser. For the two segment commutator there are two discharges per revolution.

The theory of the reversing condenser is based on the assumption that the charges and discharges for each cycle are practically completed and thus the quantity of electricity transferred for each discharge has a constant value for all speeds. The quantity varies directly as the voltage. This complete discharge is not difficult to realize. Instruments have been operated at a discharge frequency of 300 per second with no detectable deviation in the equivalent resistance from equation 11. When resistances simulating brush contact resistances were added, it was necessary to add 1000 ohms before any appreciable deviation from equation 11 was noticed. The capacity of the reversing condenser was 0.5 microfarad. Theoretically the discharges, with the 1000 ohm series resistance, were 99.5% complete.

The by-pass condenser 26 has no effect on the equivalent resistance but its use is necessary. Without the by-pass condenser the reversing condenser is not equivalent to a resistance because the charging voltage of the condenser is not that associated with the condenser arm of the bridge and the current fluctuations will affect the other arms of the bridge. The insulation of the by-pass condenser should be good and its capacity should be large enough to smooth the current fluctuations effectively.

Variations in the construction of the reversing condensers are possible. The condenser may be made stationary rather than actually rotating by adding slip rings to bring the current out. The number of segments may be increased as desired. Reciprocating contacts operated by a cam or by electrical current impulses may be substituted for the rotating commutator.

The most useful application of the reversing condenser is in resistance bridge circuits, the reversing condenser together with its parallel by-pass condenser forming one arm of the bridge. Reversing condenser 21 is automatically operated, by means which will be described, at the speed which will balance the resistance bridge of which it is a part. The circuits are such that when the balance is accomplished, the speed of the reversing condenser is directly proportional to the true air speed, and thus integrates the air distance traveled.

The reversing condenser 22 forms part of a true air-speed indicator. It is mounted on the same shaft 23 as the reversing condenser 21 and thus rotates at a speed which is proportional to the true air speed. With its by-pass condenser 27 it forms one arm of a bridge. A galvanometer 28 indicating the condition of balance of the bridge serves to indicate the true air speed. The indicator will be described in detail under the description of Figure 1.

A full description of the application of the reversing condenser as a tachometer to indicate engine speed is given in my co-pending application for U. S. Letters Patent, Serial No. 747,577 filed May 12, 1947 and entitled Condenser Tachometer.

Figure 2:
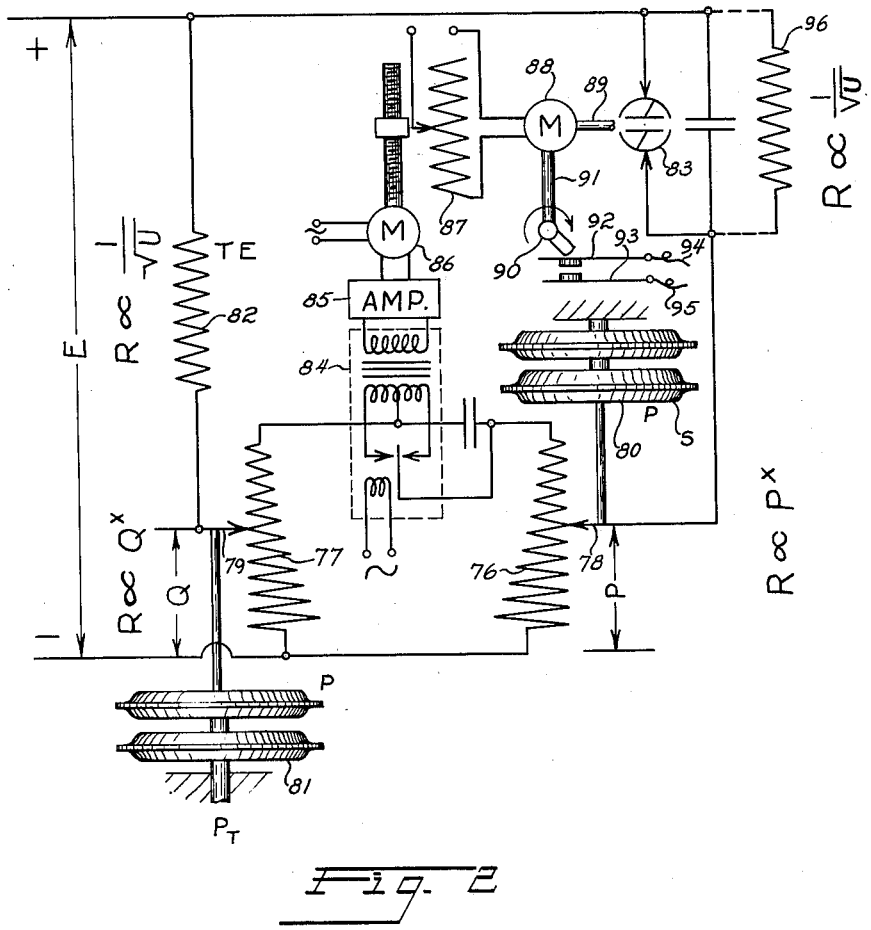
Figure 2 is a diagram of a bridge type air-speed integrator.

Figures 1 and 2 show voltage detectors which are sensitive to small direct current voltages and at the same time are rugged enough to be used in aircraft. In each case the detector is used in a resistance bridge circuit. The output of the detector is amplified and automatically controls the speed of a reversing condenser which forms one arm of the bridge.

The main component of the voltage detector is a "chopper," indicated by 29 in Figure 1. The function of the chopper is to change a small direct current voltage to an interrupted direct current or alternating voltage so that it can be amplified by an electronic amplifier. A source 30, 31 of alternating current is required to operate the chopper. Referring to Figure 1, the chopper 29 operates to bring the voltage between lines 32 and 33 to zero. Line 32 is connected to a center tap of the primary of a transformer 36 and line 33 is connected to vibrator 37 which is vibrated by the alternating current electromagnet 38 to make contact alternately with two contacts 39 and 40 which are connected to the primary of transformer 36. If any potential difference exists between lines 32 and 33, an alternating voltage will be developed in the secondary of transformer 36. This is amplified by amplifier 41 and fed into one phase of the two-phase induction motor 42. The other phase of this motor is constantly excited from the same alternating current source 30, 31 which supplies electromagnet 38. This makes motor 42 reversible, the direction of rotation depending on the relative polarity of lines 32 and 33.

Motor 42 rotates a worm shaft 43 on which is threaded a nut 44 carrying a rheostat arm 45 which moves along the rheostat 46 to control the speed of a direct current motor 47 which receives its power from the direct current power source 48, 49. The motor 47 drives the rotating shaft 23 and thus the motor speed adjusts the resistance of the reversing condenser 21 to balance the bridge.

Figure 1 shows an air-speed integrator and indicator of the type which takes the ratio of two pressures mechanically and utilizes one shaped potentiometer 52. Differential pressure bellows 53 and static pressure bellows 54 combine their actions to cause lever 55 to turn about its diaphragm seal pivot 56 as a function of the ratio Q/P.

Reversing condenser 21 is shown connected in series with fixed resistance 57 across voltage E, the reversing condenser being provided with a shunt condenser 26 for the reasons previously explained. Assuming that the current in 21 is equal to the current in 57, the speed of the reversing condenser is an unique function of the voltage $e_{57}$ divided by the supply voltage E, that is, $N=Ke_{57}/E$.

The resistance of potentiometer 52, the resistance of fixed resistor 58, and the resistance and temperature coefficient of temperature element 59 are proportioned so that the current in potentiometer 52 is $$i_{52}=KE\sqrt{U}$$

The bridge balancing mechanism consisting of chopper 29, amplifier 41, two-phase induction motor 42, and adjustable speed motor 47, serves to adjust voltage $e_{57}$ to equal voltage $e_{52}$. It follows that the speed of reversing condenser 21 is an unique function of voltage $e_{52}$ and that potentiometer 52 can be shaped to cause the speed of reversing condenser 21 to vary directly as the true air speed in accordance with exact Equation 6 which may be written for either subsonic or supersonic air speeds.

Motor 47 also drives reduction gear 60 through shaft 61. Reduction gear 61 drives cam 62 through shaft 62a and a suitable gear. Cam 62 closes contacts 63 and 64 at a frequency which is directly proportional to the true air speed, thus closing a circuit at a fixed number per mile for the operation of an air position indicator (latitude and longitude indicator), a geographical tracking machine, or the like. Contacts 63 and 64 are connected to the air position indicator by wires 65 and 66.

An air-speed indicator for use with the reversing condenser type integrator 67 is shown as 68 in Figure 1. Reversing condenser 22 is mounted on the same shaft 23 and driven at the same speed as reversing condenser 21 of the integrator 67. When the resistance bridge which includes rheostat 69, fixed resistances 70 and 71, and reversing condenser 22 to form the indicator 68 is balanced, $$R_{22} \cdot R_{69} = R_{70} \cdot R_{71}$$

Substituting $$\frac{10^6}{NC}$$

for $R_{22}$ and solving for N:

$$N=\frac{10^6 \cdot R_{69}}{R_{70} \cdot R_{71} C}=KR_{69}$$

Thus the true air speed can be read from a uniform scale alongside rheostat 69, after the contactor on this rheostat has been adjusted to balance the bridge.

Also, rheostat 69 may be provided with taps for the major speed graduations and the true air speed will be the rheostat setting plus the reading of the deflection galvanometer 28. The reason for inserting the part of rheostat 69 which is removed from the bridge arm, into the galvanometer circuit will be explained in the description of Figure 3.

Figure 2 is a schematic diagram of connections for an air-speed integrator using two exponential rheostats 76 and 77, the contactors 78 and 79 on which are operated by static pressure bellows 80 and Pitot-static differential bellows 81, respectively. As indicated on Figure 2 the potentiometers are shaped so that their resistances vary directly as $P^x$ and $Q^x$ respectively.

Another arm of the bridge, temperature element 82, has a negative temperature coefficient such that its resistance varies inversely as the square root of the apparent temperature. Reversing condenser 83 forms the fourth arm of the bridge and it will be shown that its effective resistance will vary inversely as the true air speed, that its speed will vary directly as the true air speed and that the total number of revolutions will be proportional to the air distance traveled. If the revolutions are counted for an hour the number counted will be a measure of the air distance traveled during that hour. If they are counted for a day the total will be a measure of the air distance traveled that day, etc.

Consideration of temperature element 96 will be omitted for the present, that is, the circuit will be considered first with its leads disconnected. The equation for the bridge in the balanced condition may be written, $$\frac{V}{Q^x} \propto \frac{\sqrt{U}}{P^x}$$

and $$V \approx A\left(\frac{Q}{P}\right)^x \sqrt{U}$$

This is approximate Equation 9. The bridge is continuously balanced by chopper 84, amplifier 85, two-phase motor 86, speed regulating rheostat 87, direct current motor 88 and reversing condenser 83 which is driven by motor 88 through shaft 89.

Motor 88 also drives cam 90 (through a reduction gear and shaft 91) which causes contacts 92 and 93 to close at a frequency which varies directly as the true air speed. Wires 94 and 95 lead to an air position indicator or the like.

To achieve coincidence with the accurate equation at three points temperature element 96 is added in parallel with reversing condenser 83. The negative temperature coefficient of temperature element 96 should be the same as that of temperature element 82. The conductance of the reversing condenser arm of the bridge will be:

$$G \propto V + B\sqrt{U}$$

and the equation for the bridge, when balanced, becomes:

$$\frac{V+B\sqrt{U}}{Q^x} \approxeq A\frac{\sqrt{U}}{P^x}$$

and $$V \approxeq \left[A\left(\frac{Q}{P}\right)^x - B\right]\sqrt{U}$$

This is Equation 10 and permits coincidence with accurate Equation 6 at three points.

Figure 3 is a diagram of a true air-speed indicator for use with the integrator of Figure 1 or Figure 2. The function of this indicator is the same as that of the indicator described in connection with Figure 1. Definite values have been assigned to the bridge arm resistances to illustrate more closely the functioning of the indicator. This instrument has a range of 320 to 400 knots on the manually settable potentiometer 169 and the indicator 128 has a range of plus or minus 10 knots deviation from the potentiometer value.

As shown on Figure 3, each increment of resistance which is removed from the adjustable resistance arm is inserted into the galvanometer circuit. As it works out, for the resistance values shown in Figure 3, this additional resistance in the galvanometer circuit is just sufficient to cause the galvanometer sensitivity, or deflection per R. P. M. change in speed, to be the same for all settings on the adjustable resistance.

Figure 4 shows an instrument with a ratio type indicator. This true air-speed indicator is intended for use with an air-speed integrator such as is shown in Figures 1 and 2. Reversing condenser 222 is mounted on the shaft 23 with the reversing condenser 21 of the integrator and therefore rotates at a speed which is proportional to the true air speed.

Coils 223 and 224 are respectively the voltage and null coils of a null type ratio indicator having a pointer 225. The drawing represents a stationary coil moving magnet type. It is to be understood however that a stationary magnet and moving coil type ratio indicator could be used. The current in coil 223 is limited by fixed resistance 226 and is proportional to the voltage of the supply. When the current in coil 224 is zero, the pointer 225 stands at the center of the scale. The deflection of the pointer is a function of the direction of current in coil 224 and of the ratio of the current in coil 224 to the current in coil 223. Since both of these currents are directly dependent upon the voltage of the supply, voltage variations do not affect the indications.

Potentiometer 269 is provided with manually adjustable taps which are set to the approximate speed. The true air speed is then equal to this potentiometer setting plus the ratio instrument indication.

All of the instruments described herein have delicate contacts operating on fine wire potentiometers. Such arrangements have given trouble in the past but there are two factors which make their use permissible in my instrument and provide much improved performance. First, the vibration which is always present in aircraft makes it possible to operate with slightly more contact pressure than would otherwise be permissible. Second, all of the delicate bellows operated potentiometers are adaptable to hermetic sealing in an inert gas. In order to do this a lever (see 55 of Figure 1) is introduced between the bellows and the potentiometer contact. As shown in Figure 1, the lever 55 is pivoted through the diaphragm wall 56 of the hermetically sealed compartment containing potentiometer 52. The use of a lever between the bellows and the potentiometer contact is also necessary because all parts must be balanced against accelerations and vibrations and is desirable because of the magnification of the bellows motion which may be obtained.

The curves shown in Figure 5 are typical approximation error curves for instruments utilizing approximate Equations 7 and 8. The notations on the figure are self explanatory. The curves have been drawn for an air temperature of 288 degrees absolute (15 degrees C.) since this is the standard temperature for which tables for the calibration of Pitot-static air-speed indicators have been published. The $Q/P$ values have been taken from these tables.

Similar curves could be drawn for Equations 9 and 10. The errors would be approximately the same.

The following table, applicable to Figure 5 gives the values of the constants used in calculating the error curves.

| Curve No. | $x$ | A | B | |
|---|---|---|---|---|
| 1 | 0.4322 | 43.73 | 1.68 | $V=\left[A\left(\frac{Q}{P}\right)^x - B\right]\sqrt{288}$ |
| 2 | 0.4554 | 43.31 | .72 | |
| 3 | 0.4940 | 45.27 | | |
| 4 | 0.4766 | 43.18 | | $V=A\left(\frac{Q}{P}\right)^x\sqrt{288}$ |
| 5 | 0.4399 | 41.21 | | |

It should be repeated that these errors are not always present in the instrument indications. Methods for compensating for the approximation errors have been devised for most of the instruments described. The instrument of Figure 1 is not based on an approximate equation and therefore this discussion does not apply. No method of compensation has been devised for Figure 2, but if the air-speed indicators of Figures 3 and 4 are operated from an integrator of the type shown in Figure 2, the indicators could be compensated by slight adjustment of potentiometers 169 and 269.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a true air-speed integrator; a Wheatstone bridge circuit, one arm of which includes a rotatable reversing condenser and a fixed condenser in parallel, and another arm of which comprises a total resistance variable in accordance with changes in static pressure, Pitot-static pressure, and apparent absolute temperature; a variable speed motor connected to rotate said reversing condenser; means controlled by the bridge unbalance to control the speed of said motor and said reversing condenser so as to balance the bridge; and means driven by said motor to operate a distance totalizer.

2. A a true air-speed indicator and integrator comprising a Wheatstone bridge circuit, one arm of which includes a rotatable reversing condenser and a fixed condenser in parallel, and another arm of which comprises a total resistance variable in response to changes in static pressure, Pitot-static pressure, and apparent absolute temperature; a variable speed motor connected to rotate said reversing condenser; means controlled by the bridge unbalance to control the speed of said motor and said reversing condenser so as to balance the bridge; means driven by said motor to operate a distance totalizer; a true air-speed indicator; and second means driven by said motor and operative to control said indicator.

3. In the device described in claim 2, said second means comprising a second rotatable reversing condenser driven by said motor, and a fixed condenser in parallel with said reversing condenser, a second Wheatstone bridge having said second rotatable condenser and fixed condenser in parallel forming one arm thereof, said indicator comprising a galvanometer connected to indicate the condition of balance of said second bridge, another arm of said second bridge comprising a variable resistance operable to be adjusted to balance said second bridge, said resistance being connected to the galvanometer so that the portion removed from the bridge circuit is inserted in series with the galvanometer.

4. A true air-speed integrator comprising a first means movable in response to changes in static pressure; a second means movable in response to changes in the differential Pitot-static pressure; a Wheatstone bridge circuit having in one arm a potentiometer; a movable contact arm on said potentiometer shiftable in response to the combined movement of said first and second means whereby the position of said contact is a function of the ratio of the Pitot-static differential pressure to the static pressure, and a temperature responsive resistance element in parallel with the resistance of said potentiometer; said bridge circuit having an opposite arm including a reversing condenser and a fixed condenser in parallel therewith; a third arm of said bridge including a resistance in series with said reversing condenser; means for reversing said reversing condenser and responsive to the position of said contact arm on said potentiometer, operable to adjust the speed of said reversing condenser so that the voltage drop across the resistance in said third arm will equal the voltage output of said potentiometer; and means driven by said condenser reversing means for actuating a distance totalizer.

JOHN B. PETERSON.

REFERENCES CITED

The following references are of record in the file of this patent:

UNITED STATES PATENTS

| Number | Name | Date |
|---|---|---|
| Re. 22,572 | Miller | Nov. 28, 1944 |
| 1,323,119 | Sundbaum | Nov. 25, 1919 |
| 1,573,850 | Naiman | Feb. 23, 1926 |
| 1,581,957 | Keller | Apr. 20, 1926 |
| 1,665,857 | Needham | Apr. 10, 1928 |
| 2,318,153 | Gilson | May 4, 1943 |
| 2,357,199 | Holst | Aug. 29, 1944 |
| 2,441,381 | Anderson | May 11, 1948 |
| 2,461,635 | Feller | Feb. 15, 1949 |